United States Patent [19]

Numata et al.

[11] Patent Number: 5,625,840
[45] Date of Patent: Apr. 29, 1997

[54] PROGRAMMABLE EXTERNAL STORAGE CONTROL APPARATUS

[75] Inventors: Tsutomu Numata; Yuji Kigami; Tatsuya Sakai, all of Sagamihara; Kenji Shimizu, Yamato, all of Japan

[73] Assignee: International Business Machines Corporation, Armonk, N.Y.

[21] Appl. No.: 421,713

[22] Filed: Apr. 13, 1995

Related U.S. Application Data

[63] Continuation of Ser. No. 154,248, Nov. 18, 1993, abandoned.

[30] Foreign Application Priority Data

Nov. 18, 1992  [JP]  Japan ................................. 4-308353

[51] Int. Cl.$^6$ ............................................... G06F 13/12
[52] U.S. Cl. ............................................................. 395/825
[58] Field of Search ............................... 395/650, 825, 395/821, 843, 853, 872

[56] References Cited

U.S. PATENT DOCUMENTS

| | | | |
|---|---|---|---|
| 4,420,819 | 12/1983 | Price et al. | 364/DIG. 2 |
| 4,987,530 | 1/1991 | Wagner et al. | 364/DIG. 1 |
| 5,157,770 | 10/1992 | Beardsley et al. | 364/DIG. 1 |
| 5,249,271 | 9/1993 | Hopkinson et al. | 395/250 |
| 5,287,458 | 2/1994 | Michael et al. | 395/250 |

FOREIGN PATENT DOCUMENTS

| | | |
|---|---|---|
| 3374114 | 11/1989 | European Pat. Off. . |
| 251724 | 2/1990 | Japan . |
| 0384649 | 4/1991 | Japan ........................ G06F 13/12 |

*Primary Examiner*—Thomas M. Heckler
*Attorney, Agent, or Firm*—Owen J. Gamon

[57] ABSTRACT

A programmable external storage control apparatus, including a buffer for temporarily storing data to be transferred between a host and an external storage, which stores a program for controlling data transfer between the host and the external storage and controls the data transfer between the host and the external storage by reading the data transfer control program from the buffer and executing it. The apparatus further includes a microprocessor that responds to a command from the host by starting the control of the data transfer by reading the data transfer control program. The microprocessor includes a memory for storing the data transfer control program in addition to other programs to be executed by the microprocessor. The microprocessor loads the data transfer control program from the memory into the buffer at the time of initialization. This allows the microprocessor to do other jobs such as servo control while the data transfer control program is executed.

19 Claims, 9 Drawing Sheets

PROGRAMMABLE EXTERNAL STORAGE CONTROL APPARATUS

This is a continuation of application Ser. No. 08/154,248, filed Nov. 18, 1993 now abandoned.

FIELD OF THE INVENTION

The present invention relates to a programmable external storage control apparatus, and more particularly to an external storage control apparatus having a program for controlling operational sequences of reading and writing of an external storage such as a disk drive.

BACKGROUND OF THE INVENTION

A computer system is generally provided with an external storage for storing a large volume of data, which is typically a direct access storage device (DASD). When data is transferred between a host and the external storage in such a computer system, a buffer for speed adjustment is conventionally interposed there between since the host and external storage have different data transfer rates. For example, in a personal computer system, data transfer between a hard disk drive (HDD) used as a DASD and a host is performed through a buffer (usually called sector buffer) having the capacity of about 32K to 256K bytes. The sector buffer is physically provided on the side of the HDD and a hard disk controller (HDC) reads and writes the sector buffer under the control of a microprocessor.

In the past, a sector buffer stored only data to be transferred between a host and a disk, but a technique has been developed to access the sector buffer by a microprocessor controlling the entire HDD when the host-disk data transfer is not performed. For example, Japanese Published Unexamined Patent Application 2-51724 teaches that a path for connecting data and address buses from a microprocessor to a data buffer RAM is provided in a file data processor of a disk controller, in which the data buffer RAM is used not only as a data buffer at the time of disk access, but also for intelligent command processing for SCSI, for storing error handling programs therefor, and as a work area of the microprocessor. The microprocessor may access the data buffer RAM when a disk is not read or written. A program that allows the file data processor to read or write is stored in a read only memory (ROM) of the microprocessor.

It is also known that a host, one or more peripheral devices including a disk drive, and a microprocessor can all access a shared memory according to a predetermined priority. For example, U.S. Pat. No. 4,987,530 discloses a data processing system in which a single input/output controller including a microprocessor and a buffer memory controls a plurality of input/output devices through the respective input/output device controllers so that data transfer is performed between the input/output devices and a main memory of a host CPU through a local memory bus. The buffer memory stores not only data to be transferred through the local memory bus, but also microprocessor programs. An arbiter included in a buffer control gate array decides which device may access the buffer memory. Also Japanese Published Unexamined Patent Application 2-158824 discloses a similar storage controller using a shared memory. The shared memory is partitioned into a microprocessor data storage area, a disk data storage area, and a host data storage area each of which is selectively accessed according to a predetermined priority.

Operational sequences for data transfer through such a buffer were conventionally controlled by logic of a controller such as HDC or a microprocessor program. The former method using the hardware logic has a disadvantage of less extendibility and flexibility since the hardware is designed to fit a particular external storage to be controlled and, therefore, it should be redesigned if the external storage is changed. In case of the program control, the program may be merely rewritten when the external storage is changed, but a microprocessor can not do any other job during the data transfer, which requires microprocessor intervention all the time. Accordingly, a data transfer control system having the advantages of both prior systems is desired.

SUMMARY OF THE INVENTION

According to the present invention, in a microprocessor controlled external storage control apparatus, data transfer between an external storage apparatus, such as a hard disk, and a host may be performed independently of a microprocessor and it is possible to cope with various external storage apparatuses by merely rewriting programs to be loaded into a sector buffer.

The programmable external storage control apparatus according to the present invention includes a buffer for temporarily storing data to be transferred between a host and an external storage and further storing a program for controlling data transfer between the host and the external storage; a means for controlling the data transfer between the host and the external storage by reading from the buffer and executing the data transfer control program; and a microprocessor responding to a command from the host by starting the control of the data transfer.

The microprocessor loads a data transfer control program from microprocessor memory into the program storage area of the buffer at the time of initialization, such as power on reset or initial program load. The data transfer control program can include a read control program which controls reading from external storage, such as a hard disk, to the host and a write control program which can control writing from the host to external storage. In response to a command from the host, the microprocessor initiates control of the data transfer. A sequencer reads the data transfer control program and required parameters from the program storage area of the sector buffer and executes it in order to control the data transfer through the sector buffer independently of the microprocessor.

It is an object of the present invention to provide a programmable external storage control apparatus in which the microprocessor intervention is minimized and which has more extendibility and flexibility.

Another object of the present invention is to provide a programmable external storage control apparatus in which a data transfer control program is stored in a buffer for data transfer, read out, and executed by a hardware sequencer independent of the microprocessor.

A further object of the present invention is to provide an external storage system including such an external storage control apparatus.

DETAILED DESCRIPTION OF PREFERRED EMBODIMENT

The programmable external storage control apparatus according to the present invention includes a buffer for temporarily storing data to be transferred between a host and an external storage and further storing a program for controlling data transfer between the host and the external storage; a means for controlling the data transfer between the host and the external storage by reading from the buffer and executing the data transfer control program; and a microprocessor starting the control means in reading the data transfer control program in response to a command from the host.

The microprocessor includes memory for storing the above-mentioned data transfer control program in addition to other programs to be executed by the microprocessor. The microprocessor loads the data transfer control program from the memory into the buffer at the time of initialization. This allows the microprocessor to do other jobs such as servo control while the control means is executing the data transfer control program.

Figure 1:
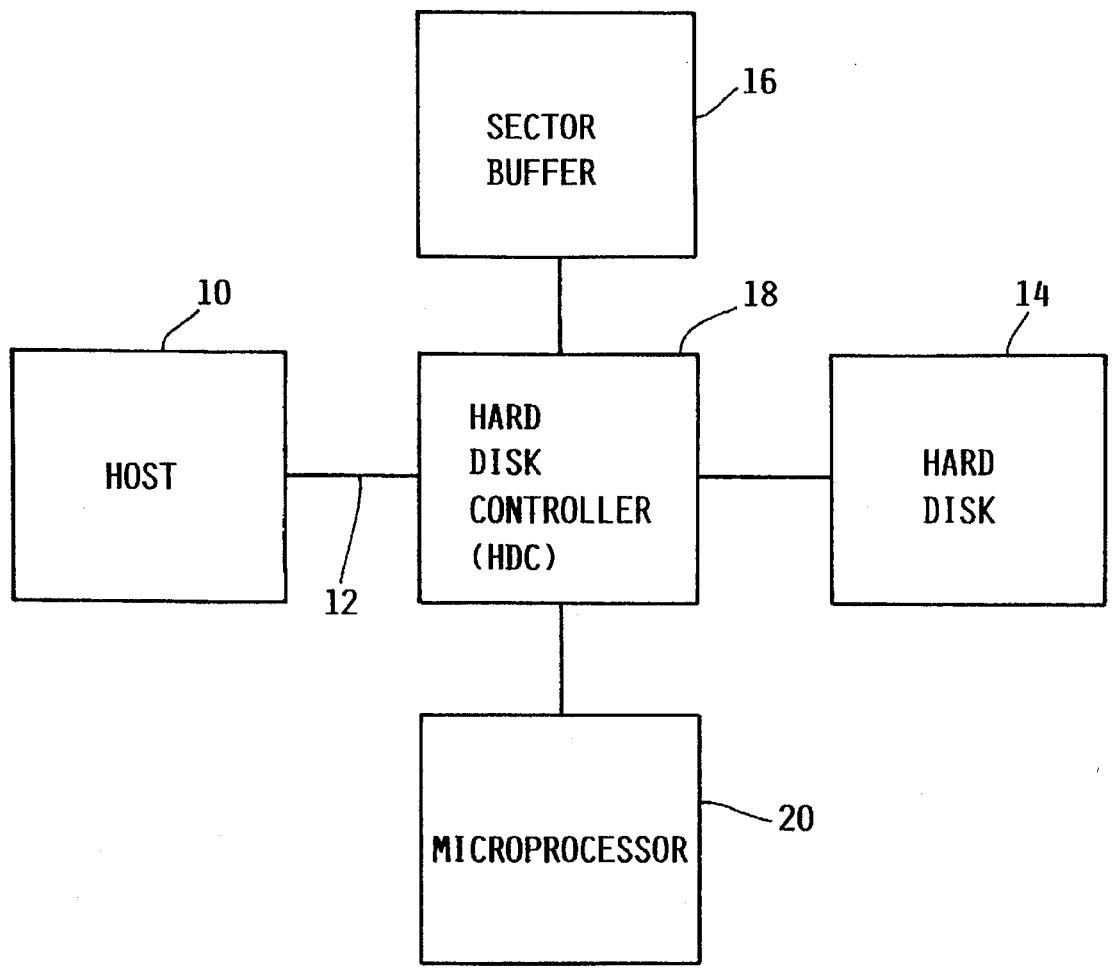
FIG. 1 is a block diagram showing an example of a computer system implementing the present invention.

FIG. 1 shows a schematic configuration of a computer system including an external storage control apparatus according to the present invention. In the preferred embodiment, the external storage is a hard disk drive, but the present invention may be applied to any external storage which performs data transfer with a host through a buffer.

The computer system of FIG. 1 may be, for example, a personal computer system and includes host 10 and an external storage system connected to host 10 through host bus 12. Though not shown in the figure, peripheral devices such as a display and a keyboard are connected to host 10. The external storage system comprises hard disk apparatus 14 to be read or written in response to a command from host 10, sector buffer 16 temporarily storing data to be written into hard disk apparatus 14 from host 10 or data to be read from hard disk apparatus 14 to host 10, hard disk controller (HDC) 18 performing data transfer through sector buffer 16, and microprocessor 20 controlling the entire external storage system, wherein sector buffer 16, HDC 18, and microprocessor 20 form the external storage control apparatus according to the present invention. The external storage control apparatus of the present invention will described, below, by using as an example a personal computer system in which host bus 12 is a known AT bus, a sector includes 512 bytes of data and a word consists of two bytes although the present invention may also be practiced in other computer systems.

Figure 2:
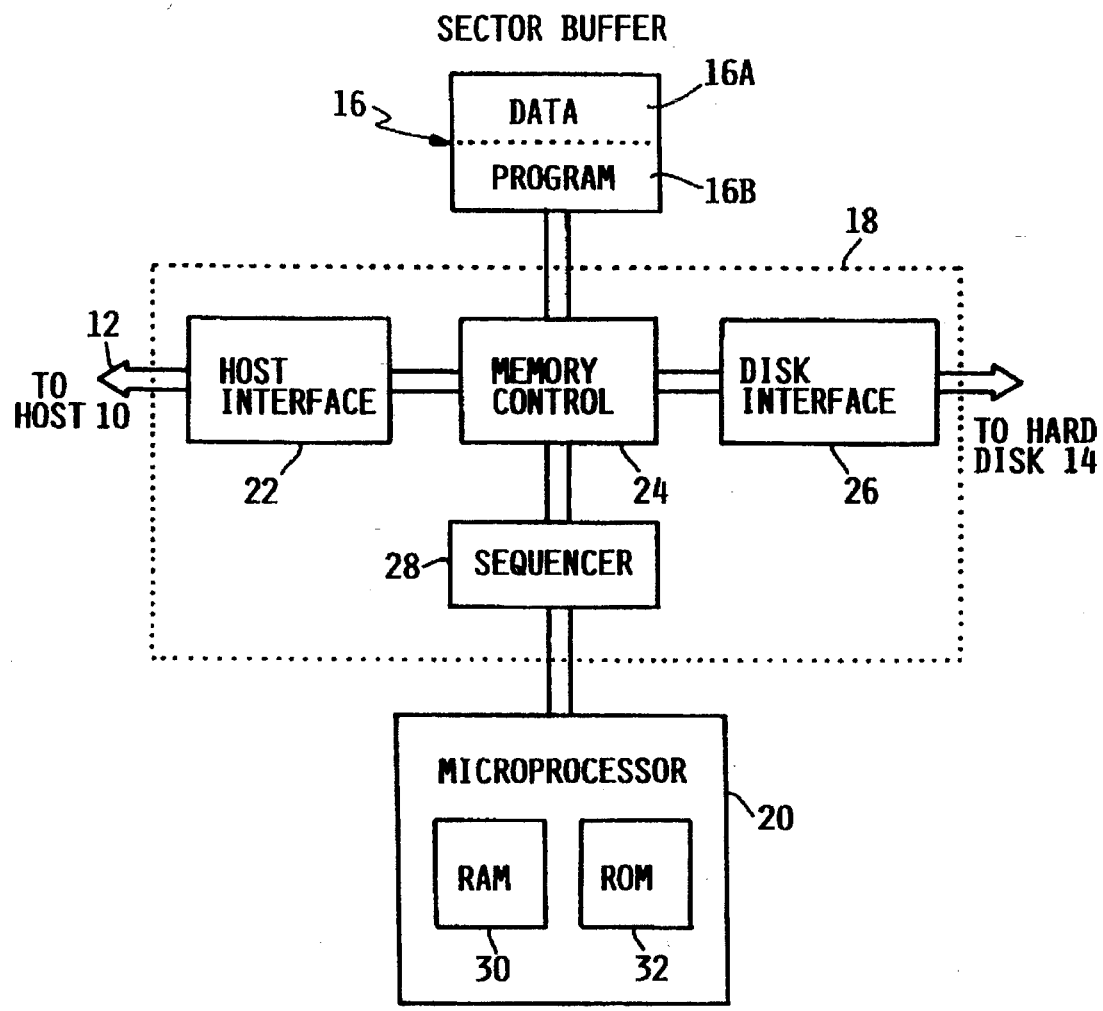
FIG. 2 is a block diagram showing the configuration of an external storage control apparatus according to the present invention.

FIG. 2 shows the above-mentioned external storage control apparatus in more detail. In FIG. 2, sector buffer 16 is partitioned into data storage area 16A and program storage area 16B which is provided according to the present invention. Sector buffer 16, which is accessed word by word, has a capacity of 64K words (128K bytes) and the storage areas 16A and 16B each contain 32K words (64K bytes). Accordingly, a start word address of the program storage area 16B is X'8000'. X denotes hexadecimal notation. Of course, these values are for illustration purpose only and the present invention is not limited thereto. Microprocessor 20 includes random access memory (RAM) 30 and read only memory (ROM) 32 which stores a program for controlling data transfer through sector buffer 16 in addition to other programs for controlling the entire external storage system. Considering program changes, ROM 32 should be replaceable.

The data transfer control program is loaded from ROM 32 into program storage area 16B at the time of initialization such as power on reset (this may be referred to as initial program load). Since the start address of the program storage area 16B is previously known (X'8000' in the above example), microprocessor 20 writes the data transfer control program by sending to sector buffer 16 addresses sequentially incremented one by one from the start address. The data transfer control program includes a read control program which controls reading from hard disk apparatus 14 to host 10 and a write control program which controls writing from host 10 to hard disk apparatus 14. In this embodiment, it is assumed that the read control program is first sequentially written beginning from the start address of program storage area 16B and then the write control program is sequentially written beginning from, for example, address X'9000' although the order of such writing into program storage area 16B of sector buffer 16 may be reversed.

In FIG. 2, HDC 18 (surrounded by dotted lines) includes host interface circuit 22 connected to host bus 12, memory control circuit 24 for controlling access to sector buffer 16, disk interface circuit 26 connected to hard disk apparatus 14, and sequencer 28 for controlling operational sequences of HDC 18. Host interface circuit 22 and disk interface circuit 26 may be those used in a conventional HDC. Host interface circuit 22 exchanges data and commands with host 10 through host bus 12 and includes plural registers and an interrupt control circuit. Memory control circuit is connected to host interface circuit 22, disk interface circuit 26, and sequencer 28 and controls data transfer between sector buffer 16 and these circuits. Disk interface circuit 26 includes a well known circuit for performing conversions and checking required between hard disk apparatus 14 and HDC 18. Sequencer 28 reads a program and required parameters stored in program storage area 16B of sector buffer 16 to control the data transfer through sector buffer 16 independently of microprocessor 20 when hard disk apparatus 14 is read or written.

In addition to above circuits 22, 24, 26 and 28, HDC 18 actually includes well-known circuits which control a voice coil motor (VCM) for moving a head of hard disk apparatus 14 and a spindle motor for rotating a disk, respectively, but such circuits are not shown in FIG. 2 since they do not relate to the present invention. Also, though not shown in FIG. 2 to prevent the figure from becoming complex, microprocessor 20 is connected not only to sequencer 28 but also to all other circuits.

Referring to FIG. 3 through FIG. 6, host interface circuit 22, memory control circuit 24, disk interface circuit 26, and sequencer 28 are described, respectively.

Figure 3:
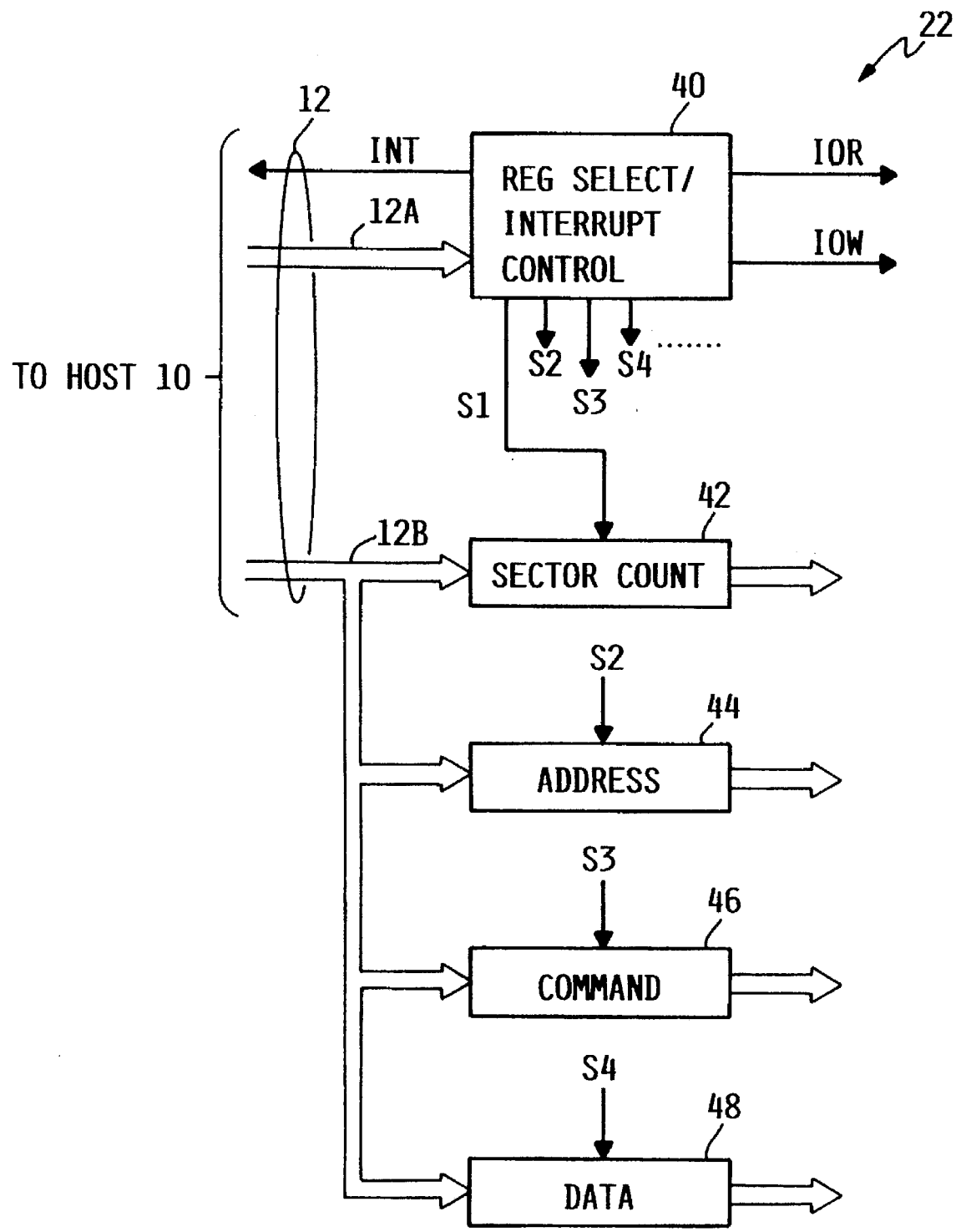
FIG. 3 is a block diagram showing an illustrative configuration of a host interface circuit in the external storage control apparatus of FIG. 2.

Host interface circuit 22 shown in FIG. 3 may be a conventional one as described above and includes plural registers selected by register select and interrupt control circuit 40, that is, sector count register 42, address register 44, command register 46, and data register 48. Sector count register 42 retains the number of sectors to be read or written, address register 44 retains a start address thereof (relative block address RBA comprising a cylinder number, a head number, and a sector number), command register 46 retains a command code, and data register 48 retains data to be written from host 10 to hard disk apparatus 14 or data to be read from hard disk apparatus 14 to host 10. These registers are selected by information provided to register select and interrupt control circuit 40 from host 10 through bus 12. At that time, circuit 40 generates a signal Si (i=1, 2, 3,) for selecting a certain register. Further, circuit 40 passes an input/output read signal IOR or input/output write signal IOW from host 10 to sequencer 28 when host 10 reads or writes data register 48 of a single word width, counts the number of times of reading or writing of data register 48, and generates and sends to host 10 an interrupt signal INT when that count reaches 256 words (512 bytes or one sector). Host 10 transfers a next sector data and reads status of HDC 18 in response to the interrupt signal INT. Japanese Patent Application 3-337995 discloses an example of such a host interface circuit.

Although FIG. 3 shows only four registers required for understanding of the present invention, more registers including a status register are actually provided as described in the AT Attachment which is a proposed standard of the AT interface.

Figure 4:
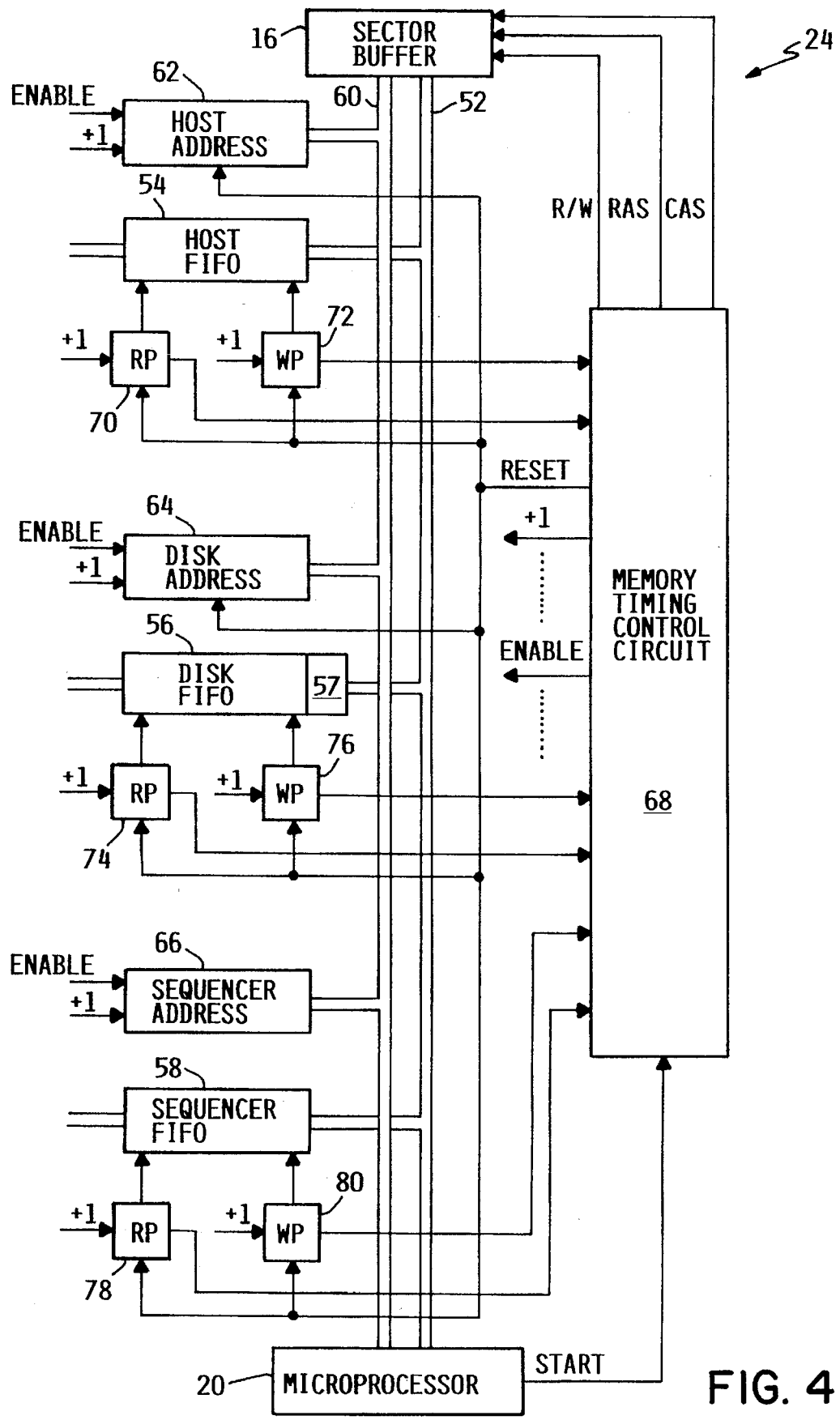
FIG. 4 is a block diagram showing an illustrative configuration of a memory control circuit in the external storage control apparatus of FIG. 2.

Memory control circuit 24 of FIG. 4 includes three first-in first-out buffers (FIFO) 54, 56, and 58 connected to one word data bus 52 of sector buffer 16; three address counters 62, 64, and 66 connected to one word address bus 60 of sector buffer 16; and memory timing control circuit 68 started by microprocessor 20. Host FIFO 54 is connected between host interface circuit 22 and sector buffer 16; disk FIFO 56 is connected between the disk interface circuit 26 and sector buffer 16; and sequencer FIFO 58 is connected between sequencer 28 and sector buffer 16. These three FIFO's 54, 56, and 58 are buffers for compensating for speed differences and, therefore, are desired to have capacities depending on data transfer rates of host 10, hard disk apparatus 14, and sequencer 28, respectively. Generally, host 10 has the fastest data transfer rate, followed by sequencer 28, and hard disk apparatus 14 is the slowest. In the embodiment, host FIFO 54, sequencer FIFO 58, and disk FIFO 56 have capacities of 8 words, 6 words, and 8 bytes, respectively. Of course, these capacity values are used for illustration purposes only, and the present invention is not limited thereto.

Among the three FIFO's, host FIFO 54 and sequencer FIFO 58 are accessed on a word basis while disk FIFO 56 is accessed essentially on a byte basis since the width of bus 59 between disk FIFO 56 and disk interface circuit 26 is one byte. However, since the transfer between sector buffer 16 and disk FIFO 56 is performed on a word basis, disk FIFO 56 is provided with byte/word converter 57 at a connecting port for data bus 52. Converter 57 divides each word from sector buffer 16 into two bytes at the time of writing to disk FIFO 56 from sector buffer 16 and, on the other hand, assembles a word from consecutive two bytes and outputs the word to data bus 52 at the time of writing to sector buffer 16 from disk FIFO 56. Data bus 52 and address bus 60 are also connected to microprocessor 20 so that microprocessor 20 can directly access sector buffer 16. This access is required to load the data transfer control program from ROM 32 of microprocessor 20 into program storage area 16B of sector buffer 16 at the time of initialization.

As is well known in the art, FIFO's 54, 56 and 58 are accessed by the respective read pointers RP and write pointers WP. Each pointer is of a wrap-around type, and returns to zero after a maximum address of the associated FIFO is reached. Unless RP=WP and RP=WP+1, each FIFO can perform a read operation using the RP and a write operation using the WP simultaneously. RP=WP indicates that data to be read is not in the FIFO and, therefore, only a write operation is permitted in that case. RP=WP+1 indicates that the FIFO is full of data not yet read and, therefore, only a read operation is permitted. These conditions are checked by memory timing control circuit 68.

Increment signals (+1) to the RP and WP are provided by memory timing control circuit 68 and associated circuits. For simplification, only one increment signal from memory timing control circuit 68 is shown in FIG. 4, but actually an increment signal is individually provided to each of the RP and WP. The RP and WP are incremented by the individual increment signals from memory timing control circuit 68 in case of the transfer between the associated FIFO and sector buffer 16, and are incremented by the increment signals from the respective associated circuit in case of the transfer between each FIFO and the associated circuit. For example, RP 70 is incremented by the input/output read signal IOR from register select and interrupt control circuit 40 shown in FIG. 3 when the contents of host FIFO 54 are read out to host interface circuit 22, and WP 72 is incremented by the input/output write signal IOW when data from host interface circuit 22 is written into FIFO 54. Similarly, RP 74 and WP 76 are incremented by a byte signal from disk interface circuit 26 in case of the transfer between disk FIFO 56 and disk interface circuit 26, and RP 78 and WP 80 are incremented by an increment signal from sequencer 28 in case of the transfer between sequencer FIFO 58 and sequencer 28.

Address counters 62, 64 and 66 are used to address sector buffer 16. Since the capacity of sector buffer 16 is 64K words in the embodiment, a 16-bit address is required for its full addressing and, therefore, each address counter is of 16-bit width. The 16-bit address is divided into a row address consisting of higher order 8 bits and a column address consisting of lower order 8 bits, and outputted to 8-bit address bus 60. A row address select signal RAS and a column address select signal CAS from memory timing control circuit 68 indicate which address is being transmitted over address bus 60. Each address counter is enabled and incremented by control signals from memory timing control circuit 68 when data is transferred between the associated FIFO and sector buffer 16. At that time, memory timing control circuit 68 sets a R/W signal high and low for reading from and writing to sector buffer 16, respectively. Additionally, memory timing control circuit 68 continuously checks the contents of each RP and WP and determines access timing for sector buffer 16 based thereon.

Figure 7A:
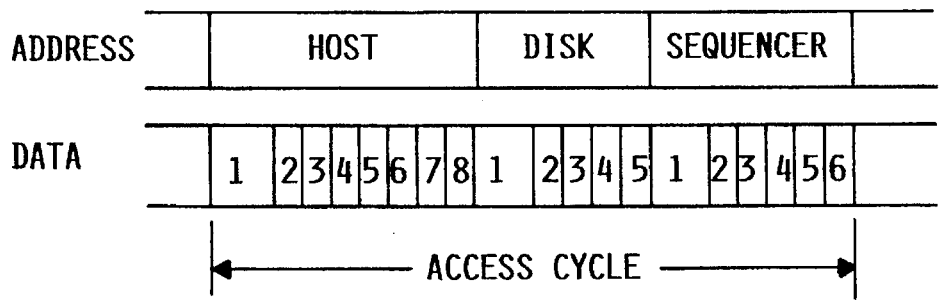
FIG. 7 shows examples of time sharing access modes for a sector buffer.
Figure 7B:
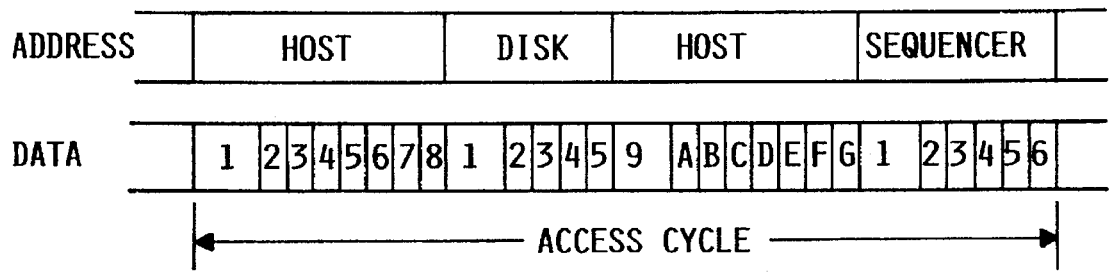
Figure 7C:
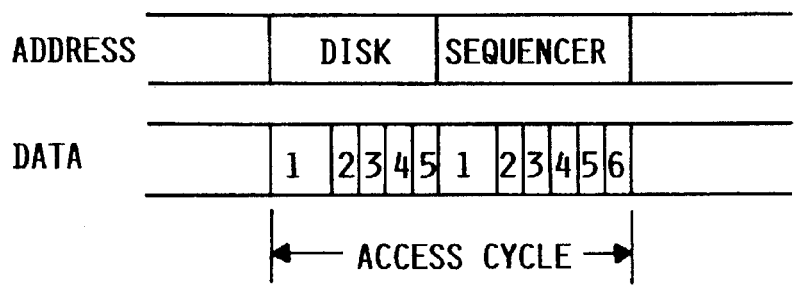

Referring to FIG. 7, the access timing for sector buffer 16 is now described. In FIG. 7, (A) shows standard access in a time sharing mode in which an access cycle of sector buffer 16 is segmented into a host phase, a disk phase, and a sequencer phase. According to the access cycle, transfer of a maximum of 8 words is first performed between host FIFO 54 and sector buffer 16 using host address counter 62, then transfer of a maximum of 5 words is performed between disk FIFO 56 and sector buffer 16 using disk address counter 64, and finally transfer of a maximum of 6 words is performed between sequencer FIFO 58 and sector buffer 16 using sequencer address counter 66. Memory timing control circuit 68 repeats the cycle until data to be transferred no longer exists. In each phase, an access time for the first word 1 is longer, which occurs due to a page mode access. That is, the first word should be accessed by sequentially supplying a row address and a column address from the associated address counter to sector buffer 16 while the remaining words can be accessed only by column addresses. (B) shows a case in which host 10 has a faster data transfer rate and a host phase for accessing 8 words is inserted every second phase.

If host data has run out in the time sharing mode A or B, memory timing control circuit 68 enters a mode shown by (C) and alternately repeats the disk and sequencer phases. Also, if disk data does not exist as, for example, when a sector ID is read out, memory timing control circuit 68 refreshes sector buffer 16 in the disk phase in any mode. IBM Technical Disclosure Bulletin, Vol. 33, No. 9, February 1991, pp.193–194 describes a refresh control suitable for such refresh. A static RAM (SRAM), which does not require to be refreshed, may be used for sector buffer 16, but it is expensive as compared with DRAM. Additionally, if it becomes unable to continue accessing in a certain phase due to the above-mentioned conditions for the RP and WP, the access in the phase is terminated at that time and new access is started in the following phase.

Referring again to FIG. 4, the access of sector buffer 16 in the time sharing mode is now described in more detail in accordance with an example of reading from hard disk apparatus 14 to host 10. Since data to be written to the host FIFO from sector buffer 16 does not exist at first, memory timing control circuit 68 sets the time sharing mode C, as shown in FIG. 7. Data read from hard disk apparatus 14 is written to disk FIFO 56 byte by byte by sequentially incrementing WP 76 under the control of disk interface circuit 26. When a difference between RP 74 and WP 76 exceeds a predetermined value (e.g. 4), memory timing control circuit 68 starts transfer from disk FIFO 56 to sector buffer 16 by enabling disk address counter 64, setting the R/W signal to sector buffer 16 low, and sequentially sending the RAS and CAS to sector buffer 16. Reading from disk FIFO 56 is performed by incrementing RP 74 one by one by the increment signal from memory timing control circuit 68 and by converting consecutive two bytes into one word in byte/word converter 57. Writing from disk interface circuit 26 into disk FIFO 56 and reading from disk FIFO 56 into sector buffer 16 may be performed simultaneously as far as the values of RP 74 and WP 76 satisfy the above condition.

When five words have been transferred from the disk FIFO 56 to sector buffer 16, memory timing control circuit 68 starts transfer from sector buffer 16 to sequencer FIFO 58 by changing the access of sector buffer 16 to the sequencer phase and enabling sequencer address counter 66. Sequencer address counter 66 is preset to a start address of program storage area 16B, that is, an address of the first instruction word of the above read control program and the first to sixth instruction words are continuously transferred to sequencer FIFO 58 in the sequencer phase. Memory timing control circuit 68 performs such transfer by incrementing sequencer address counter 66 and WP 80 one by one. When the difference between RP 78 and WP 80 exceeds a predetermined value (e.g. 3), memory timing control circuit 68 starts transfer from sequencer FIFO 58 to sequencer 28. Sequencer 28 reads sequencer FIFO 58 by incrementing RP 78 one by one. When six words have been transferred from sector buffer 16 to the sequencer FIFO, memory timing control circuit 68 changes again to the disk phase.

When a sector of data, that is, 512-byte data has been written to sector buffer 16 with no error as a result of the access in the time sharing mode C, the memory timing control circuit 68 changes the time sharing mode from C to A (or B) upon completion of the sequencer phase so as to transfer the data to the host FIFO 54, and =starts the transfer from sector buffer 16 to host FIFO 54 by enabling the host address counter 62. When eight words have been transferred from the sector buffer 16 to the host FIFO 54 by incrementing host address counter 62 and WP 72 one by one, memory timing control circuit 68 changes the phase from host to disk. If the difference between RP 70 and WP 72 reaches a predetermined value (e.g. 4) during the transfer, memory timing control circuit 68 directs host interface circuit 22 to read host FIFO 54. In response thereto, host interface circuit 22 transfers the first word to data register 48, and then interrupts host 10. Host 10 responds to the interrupt by sending a command to read data register 48 to host interface circuit 22. Host interface circuit 22 reads the next word from host FIFO 54 to data register 48 by using the input/output read signal IOR simultaneously sent from host 10 as an increment signal for RP 70, and interrupts host 10. Similar operations are repeated thereafter.

As described above, reading from hard disk apparatus 14 to host 10 is performed by repeating the access cycles in the time sharing modes A (or B) and C. Writing from host 10 to hard disk apparatus 14 is also performed in a similar manner. Sequencer 28 controls such reading and writing by executing the program read from sector buffer 16 in the sequencer phase (details will be described later).

Figure 5:
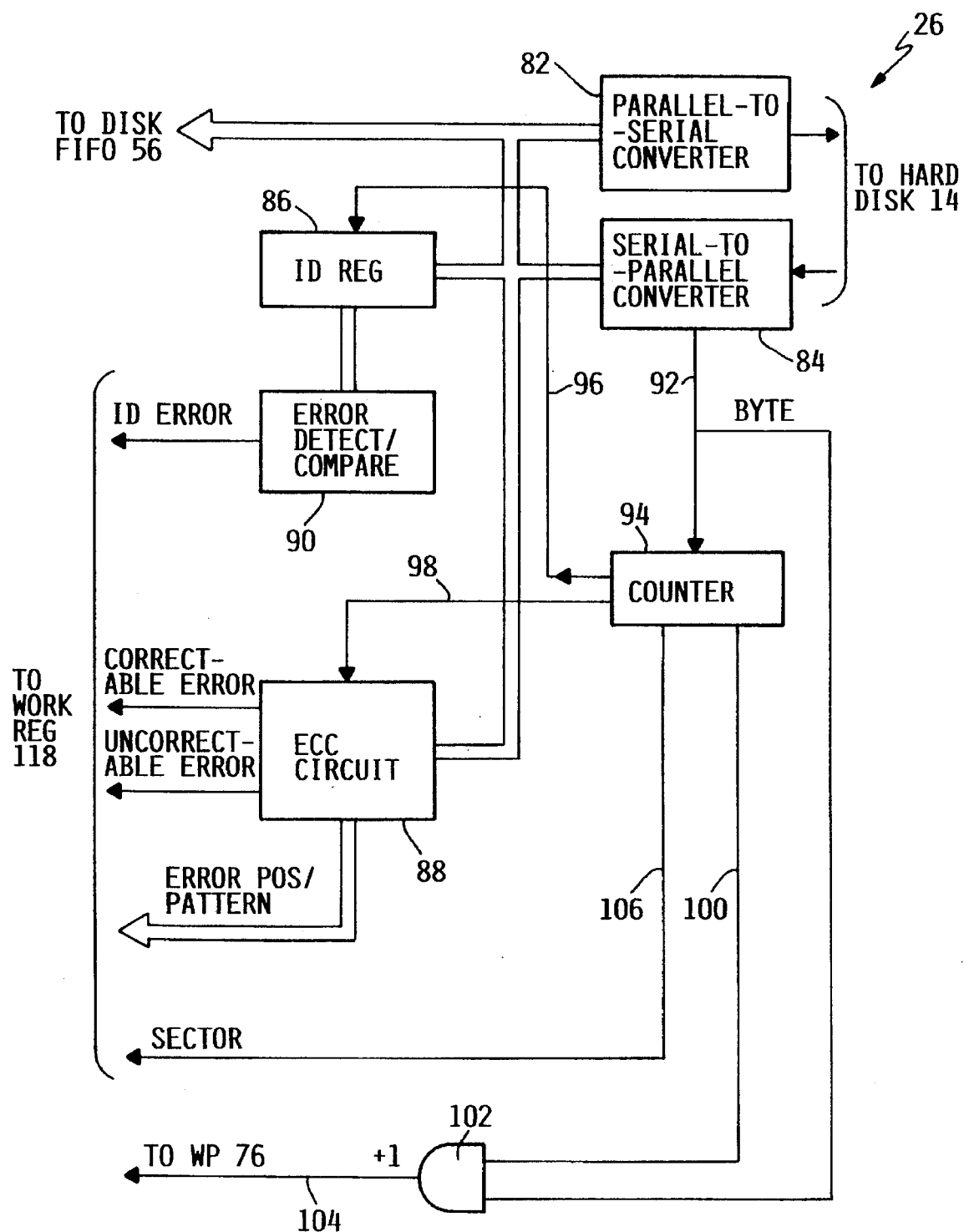
FIG. 5 is a block diagram showing an illustrative configuration of a disk interface circuit in the external storage control apparatus of FIG. 2.

Disk interface circuit 26 shown in FIG. 5 includes parallel-to-serial converter 82 for converting a byte of parallel data from disk FIFO 56 to serial data and serial-to-parallel converter 84 for converting serial data from hard disk apparatus 14 to a byte of parallel data. The serial data from parallel-to-serial converter 82 is sent to hard disk apparatus 14 after being converted to analog signals, and sequentially written into a specified sector location. The parallel data from serial-to-parallel converter 84 is sent to ID register 86 if it is a sector ID, or sent to disk FIFO 56 and ECC circuit 88 if it is ordinary sector data. As is well known in the art, a sector ID is recorded in a leading portion of each sector in hard disk apparatus 14 and contains an address mark (AM) and a relative block address (RBA). An ID of a sector to be accessed is previously set in ID register 86 by microprocessor 20 and error detect and compare circuit 90 notifies sequencer 28 of an ID error if the sector ID from serial-to-parallel converter 84 and the preset sector ID do not coincide with each other or if there is an error in the sector ID from serial-to-parallel converter 84.

If there is an error in the sector data read from hard disk apparatus 14, ECC circuit 88, which is a well-known error correcting logic circuit, outputs either a correctable or uncorrectable error signal depending on whether the error is correctable or not and further outputs signals indicating its error position and error pattern in case of the correctable error. In response to these signals, sequencer 28 corrects the error. For writing from host 10, ECC circuit 88 generates an 11-byte ECC code for each 512-byte sector data sequentially sent from disk FIFO 56 and sends it to parallel-to-serial converter 82. Error checking is not performed for data to be written.

Serial-to-parallel converter 84 outputs a byte signal to line 92 each time when conversion of a byte is completed. Counter 94 counts the byte signal, generates a signal on line 96 for loading the sector ID into ID register 86 while that sector ID is being outputted from serial-to-parallel converter 84 (e.g. the first to seventh bytes), and generates a signal on line 98 for loading the output of serial-to-parallel converter 84 into ECC circuit 88 while the subsequent 523 bytes, that is, 512 data bytes and 11 ECC bytes are being outputted. Further, counter 94 activates line 100 to condition AND gate 102 while the 512 data bytes are being outputted. A second input of AND gate 102 is connected to line 92 so that AND gate 102 passes the byte signal on line 92 to line 104 while the sector data of 512 bytes is being read from hard disk apparatus 14. The byte signal on line 104 is applied to WP 76 in FIG. 4 as an increment signal. When the reading of 512 data bytes is completed, counter 94 generates a sector signal on line 106 and sends it to sequencer 28. In response to the sector signal, sequencer 28 updates a sector count.

Figure 6:
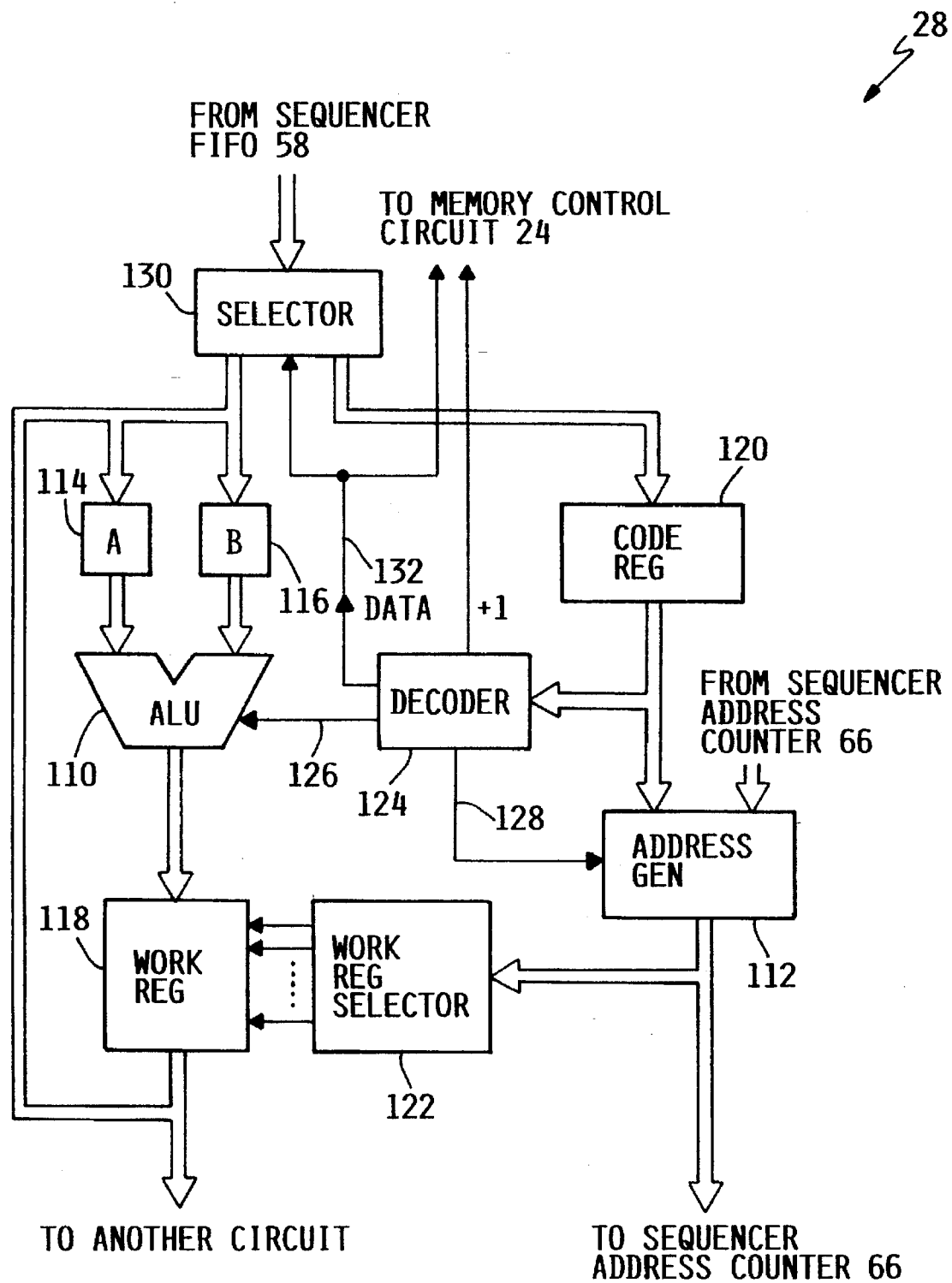
FIG. 6 is a block diagram showing an illustrative configuration of a sequencer in the external storage control apparatus of FIG. 2.

Sequencer 28 shown in FIG. 6 includes address generator 112 in addition to conventional arithmetic and logical unit (ALU) 110. Inputs to the ALU are provided from A register 114 and B register 116 each of which serves as an accumulator, and its output is provided to work registers 118. Inputs to address generator 112 are provided from code register 120 and sequencer address counter 66 in FIG. 4, and its output is provided to sequencer address counter 66 and work register selector 122. Work register selector 122 selects a work register in response to an address from address generator 112. "Work register" as used herein is a generic term and refers to every register included in HDC 18. This means that sequencer 28 may access any register in HDC 18 and, hence, may control each circuit within HDC 18.

A register 114 and B register 116 receive data from work registers 118 or sequencer FIFO 58 shown in FIG. 4, and code register 120 receives a program instruction from sequencer FIFO 58. Decoder 12 decodes the program instruction and generates control signals on lines 126 and 126 that cause ALU 110 and address generator 112 to perform specified operations, respectively. In response to the control signal on line 126, ALU 110 performs an arithmetic operation such as addition, subtraction or the like, or a logical operation such as AND, OR or the like. In response to the control signal on line 128, address generator 112 increments the contents of sequencer address counter 66 by one and writes back thereto, generates a register address for work registers 118 or an address for retrieving data from sector buffer 16, using an address included in the program instruction from code register 120, or generates a new instruction address by adding the addresses from code register 120 and address counter 66.

Usually, sequencer 28 receives a program instruction from sector buffer 16 through sequencer FIFO 58. However, if the program instruction loaded into code register 120 specifies data reading, selector 130 is switched by a data read signal generated on line 132 by decoder 124 so that the data from sequencer FIFO 58 is directed to A register 114 and B register 116. The data read signal on line 132 is also sent to memory control circuit 24 to reset both pointers RP 78 and WP 80 of sequencer FIFO 58.

Figure 8:
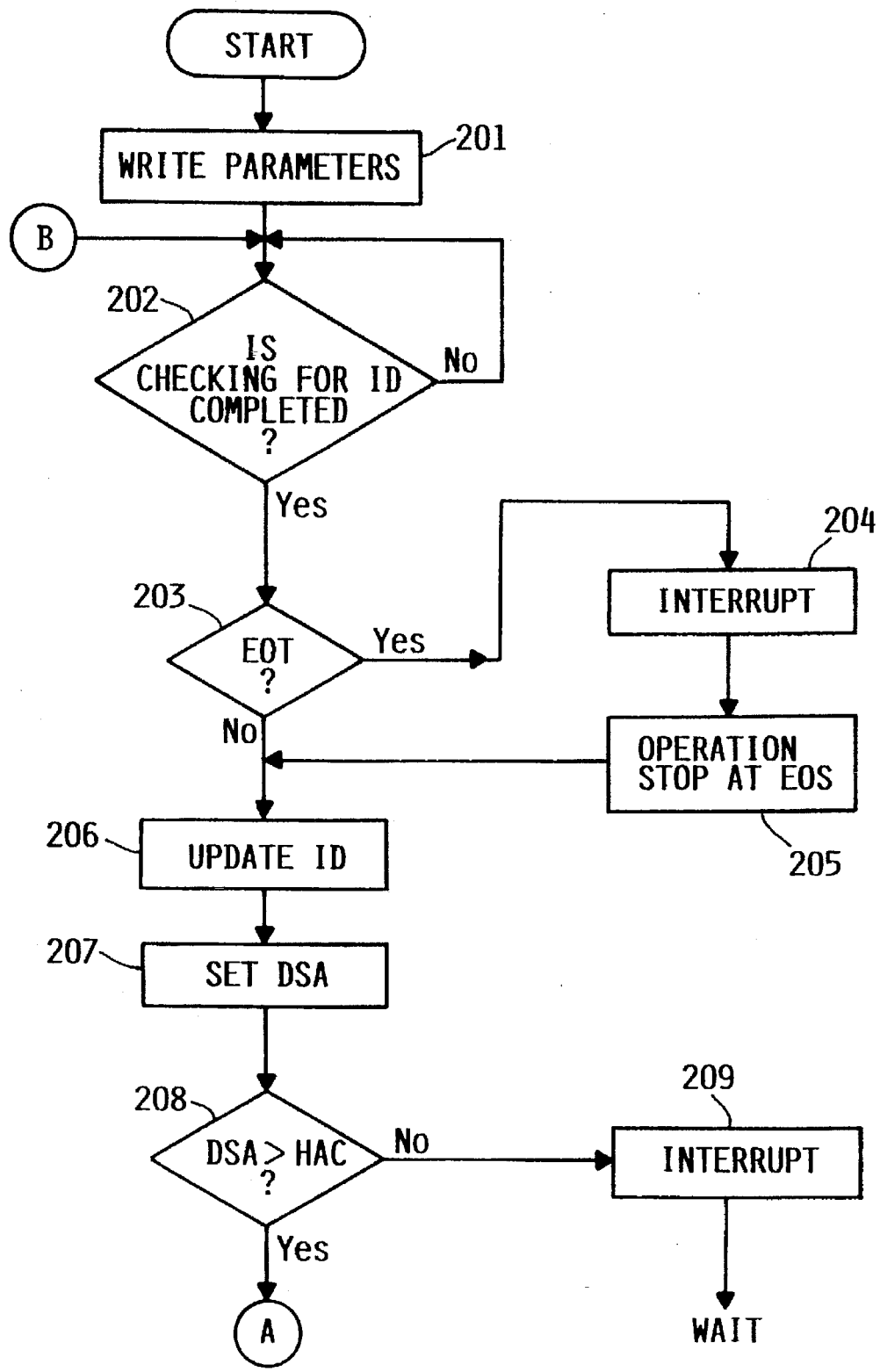
FIG. 8 is a flow chart showing a first half of a read control program.
Figure 9:
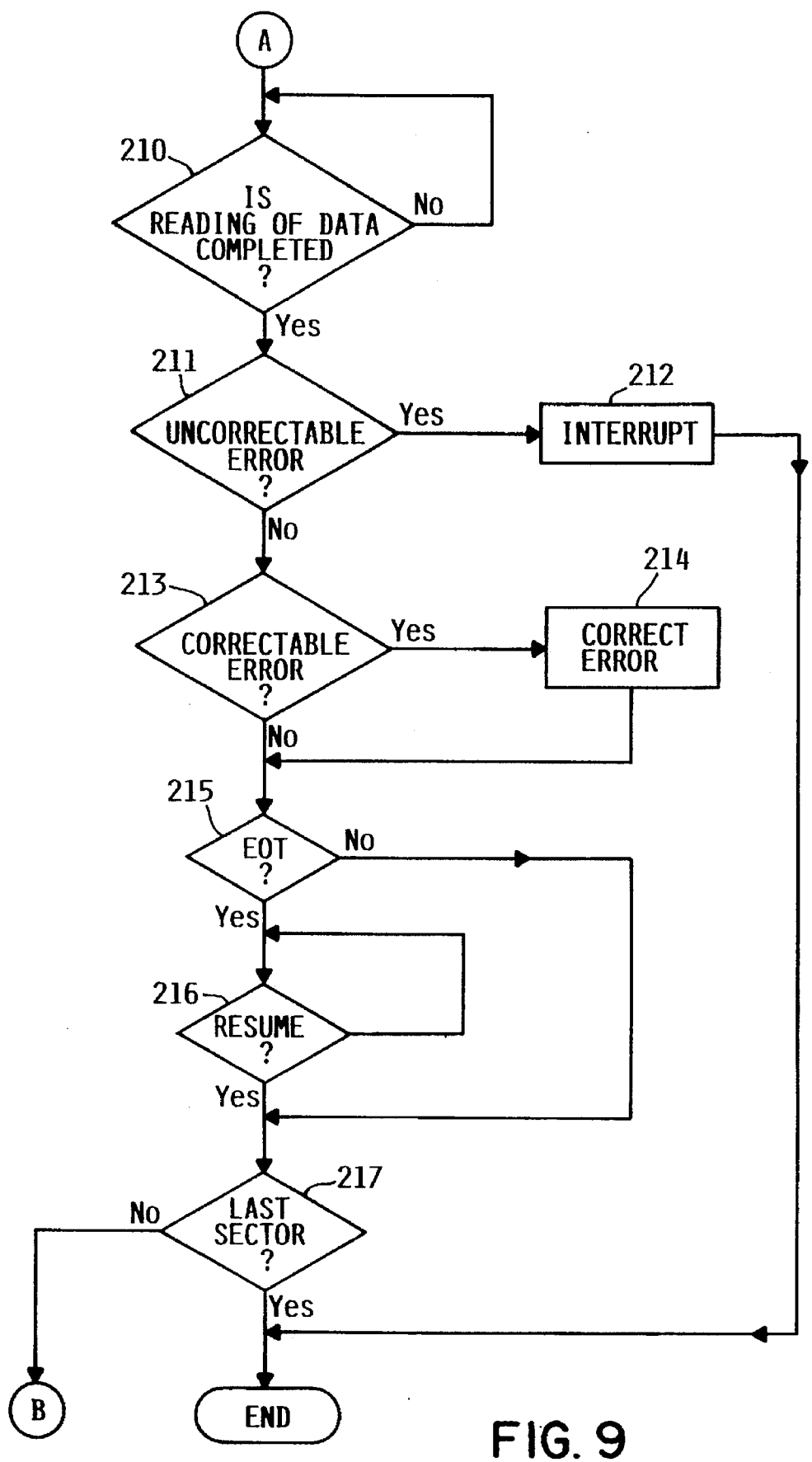
FIG. 9 is a flow chart showing a second half of the read control program.

For illustrating a program to be executed by sequencer 28, a flowchart of the above mentioned read control program is shown in FIG. 8 and FIG. 9. The read control program is read from sector buffer 16 to sequencer 28 when a read command is received from host 10.

The read command and related parameters, i.e. a sector count indicating the number of sectors to be read and an address of a sector from which reading is started, from host 10 are received by command register 46, sector count register 42, and address register 44 in such a manner as described in the above Application 3-337995. Register select and interrupt control circuit 40 interrupts microprocessor 20 when receipt thereof is completed. In response to the interrupt from register select and interrupt control circuit 40, microprocessor 20 reads and decodes the contents of command register 46. If decoded is a read command, microprocessor 20 loads a start address of the read control program into sequencer address counter 66, sends a start signal to memory timing control circuit 68 shown in FIG. 4, loads a sector ID corresponding to the start address in address register 44 of host interface circuit 22 (FIG. 3) into ID register 86 of disk interface circuit 26 (FIG. 5), and causes reading of hard disk apparatus 14 to be started. Memory timing control circuit 68 resets host address counter 62, disk address counter 64, and all of the read pointers RP's 70, 74 and 78 and write pointers WP's 72, 76 and 80 to 0, and starts accessing of sector buffer 16 in the time sharing mode C described above, in response to the start signal from microprocessor 20.

Since the sector ID is first read from hard disk apparatus 14, it is sequencer 28 which first accesses sector buffer 16 in the time sharing mode C. Therefore, after refreshing sector buffer 16 instead of the first disk phase, memory timing control circuit 68 provides an enable signal to sequencer address counter 66 and sets a R/W signal to sector buffer 16 high to indicate reading. When enabled by the enable signal, sequencer address counter 66 outputs its contents, i.e. the start address of the read control program to address bus 60. The first instruction word is read from program storage area 16B in sector buffer 16 and outputted to data bus 52. This instruction word is written into a location of sequencer FIFO 58 specified by WP 80 (initially set to 0). In sequencer FIFO 58, writing into FIFO 58 and reading out to sequencer 28 are simultaneously performed only for the first instruction word. Then memory timing control circuit 68 increments sequencer address counter 66 and WP 80 by one to cause the next instruction word to be transferred from sector buffer 16 to sequencer FIFO 58.

In sequencer 28 shown in FIG. 6, the data signal on line 132 is low so that selector 130 passes the first instruction word from sequencer FIFO 58 to code register 120. Decoder 124 decodes it to generate necessary control signals and increment RP 78 by one. Thereafter, sequencer 28 sequentially executes the read control program shown in FIG. 8 and FIG. 9.

Referring to FIG. 8, the read control program is now described step by step. Block 201 writes parameters loaded into sector count register 42 and address register 44 in host interface circuit 22 (FIG. 3) to particular locations of program storage area 16B. The addresses of registers 42 and 44 and the locations for the parameters to be written are specified by instructions transferred from program storage area 16B to code register 120 through sequencer FIFO 58. Decoder 124 decodes these instructions and first saves the contents of sequencer address counter 66 in a predetermined location of sector buffer 16. The register addresses are inputted to work register selector 122, the addresses of the locations to which the parameters are to be written are loaded into sequencer address counter 66, and necessary directions are given to memory timing control circuit 68. Accordingly, the contents of registers 42 and 44 are written to sector buffer 16 through sequencer FIFO 58. After the parameters have been written, the contents saved in sector buffer 16 are returned to sequencer address counter 66.

Block 202 determines whether checking of the sector ID is completed. As described above, the sector ID read from hard disk apparatus 14 is checked by error detect and compare circuit 90 in disk interface circuit 26 (FIG. 5) and its result is written into a particular work register (error register). Accordingly, sequencer 28 reads out the contents of the error register to determine whether reading of the sector ID is completed with no error. This checking can be easily performed by ALU 110. After the checking of the sector ID has been completed, the flow continues to a block 203.

Block 203 determines whether the end of track (EOT) is reached, that is, a sector for which checking is completed in block 202 is the last sector in a track. The sector ID contains an EOT flag, which is set on for the last sector. Sequencer 28 executes block 203 by checking the contents of ID register 86 by ALU 110. If the EOT is reached, the flow goes to block 204 where sequencer 28 interrupts microprocessor 20 and stops the operation at the end of that sector (EOS) (block 205). The operation is actually stopped after reading of the sector data is completed. At that time, the microprocessor causes a head of hard disk apparatus 14 to be moved to the next track. If the EOT is not reached, the flow goes to block 206.

Block 206 loads an ID of the next sector into ID register 86 to prepare for reading of the next sector. This is accomplished by reading the start address included in the parameters written to sector buffer 16 in step 201 into sequencer 28 and updating it by ALU 110. Sequencer 28 loads the updated address (RBA) into ID register 86 and writes it back to sector buffer 16.

Block 207 sets a disk start address (DSA), which is a start base address at the time of writing data of the next sector into sector buffer 16, to a particular work register. Block 208 compares the DSA with the contents of host address counter 62, HAC. (During the execution of the read control program by sequencer 28, memory timing control circuit 68 is performing data transfer from sector buffer 16 to host FIFO 54 using host address counter 62.) If DSA=HAC, it means that there is no data to be read from sector buffer 16 to host FIFO 54. In that case, the flow goes to step 209 which interrupts microprocessor 20 and waits until a sector of data is written to sector buffer 16 and the DSA is updated.

Referring to FIG. 10, if DSA is greater than HAC, the flow goes to step 210 which determines whether the data reading for the current sector is completed. This is accomplished by checking a state of the sector signal outputted to line 106 from counter 94 (FIG. 5). If completed, the sector count is updated and then step 211 checks whether an uncorrectable error has occurred based on the contents of the error register which is one of work registers 118. If the error has occurred, the flow goes to block 212 to interrupt microprocessor 20.

If the uncorrectable error has not occurred, the flow goes to block 213 which determines whether a correctable error has occurred. This can also be determined from the contents of the error register. If the correctable error has occurred, the flow goes to block 214 which corrects the error using the error position data and error pattern loaded into work registers 118 from ECC circuit 88 shown in FIG. 5. The error position data identifies an erroneous byte. Accordingly, in response to an error correction instruction, sequencer 28 loads an address of a word containing the error byte into sequencer address counter 66 and notifies memory timing control circuit 68 of data reading through line 132. In response thereto, memory timing control circuit 68 resets both pointers 78 and 80 of sequencer FIFO 58 to 0 and performs reading from sector buffer 16 to sequencer FIFO 58. The error byte read is loaded from selector 130 into B register 116. ALU 110 corrects the error by performing an exclusive OR operation on the error byte and the corresponding error pattern which has been loaded into A register 114. The word containing the corrected byte is written back into the original location of sector buffer 16 through sequencer FIFO 58.

After the error correction is completed, the flow goes to block 215 which determines whether the end of track (EOT) is reached. If the EOT is reached, the flow goes to block 216 and waits until the next track is ready for being read. If the operation can be resumed or the EOT is not reached, the flow goes to block 217 which determines whether the read sector is the last sector for this read command. This is accomplished by comparing the sector count written into the sector buffer 16 by block 201 with the sector count updated at the end of block 210. In case of the last sector, the execution of the read control program is completed, otherwise the flow returns to block 202.

For a write control program, its basic operations are the same as in the reading except that the direction of data transfer is opposite and the error correction is not done.

What is claimed is:

1. A programmable external storage control apparatus for controlling an external storage in response to a command from a host, comprising:

a buffer temporarily storing data to be transferred between said host and said external storage and further storing a program for controlling data transfer between said host, said buffer, and said external storage;

control means for controlling said data transfer by reading from said buffer and executing said program, which controls said data transfer between said host, said buffer, and said external storage; and a microprocessor starting said control means in reading said program in response to said command from said host.

2. The programmable external storage control apparatus of claim 1, wherein said microprocessor has a memory where said program is stored, and said microprocessor loads said program from said memory into said buffer at initialization time.

3. The programmable external storage control apparatus of claim 2, wherein said buffer is partitioned into data storage and program storage areas and said microprocessor loads said program from said memory into said program storage area by specifying a start address of said program storage area at said initialization time.

4. The programmable external storage control apparatus of claim 1, wherein said control means further comprises:

host interface means for exchanging data and commands with said host;

external storage interface means for exchanging data with said external storage;

sequencer means for executing said program; and memory control means connecting said host interface means, said external storage interface means, and said sequencer means to said buffer for controlling transfer between them and said buffer.

5. The programmable external storage control apparatus of claim 4, wherein said microprocessor starts said memory control means in response to a command from said host and starts transfer between said buffer and said host interface means, said external storage interface means, and said sequencer means in a time sharing mode.

6. The programmable external storage control apparatus of claim 5, wherein said memory control means performs transfer between said buffer and said host interface means, said external storage interface means, and said sequencer means through respective first-in first-out buffers.

7. The programmable external storage control apparatus of claim 4, wherein said sequencer means further comprises:

a decoder for decoding program instructions read from said buffer;

arithmetic means and address generating means controlled by signals from said decoder; and register selecting means for selecting a register in said control means based on an address from said address generating means.

8. An external storage system in which data is read or written by a command from a host, comprising:

an external storage for storing said data;

a buffer that temporarily stores data to be transferred between said host and said external storage and further stores a program for controlling data transfer between said host, said buffer, and said external storage;

control means for controlling said data transfer by reading from said buffer and executing said program, which controls said data transfer between said host, said buffer, and said external storage; and a microprocessor for starting said control means in reading said program in response to said command from said host.

9. The external storage system of claim 8, wherein said microprocessor has a memory where said program is stored, and said microprocessor loads said program from said memory into said buffer at initialization time.

10. The external storage system of claim 9, wherein said buffer is partitioned into data storage and program storage areas and said microprocessor loads said program from said memory into said program storage area by specifying a start address of said program storage area at said initialization time.

11. The external storage system of claim 8, wherein said control means further comprises:

host interface means for exchanging data and commands with said host;

external storage interface means for exchanging data with said external storage;

sequencer means for executing said program; and memory control means connecting said host interface means, said external storage interface means, and said sequencer means to said buffer for controlling transfer between them and said buffer.

12. The external storage system of claim 11, wherein said microprocessor starts said memory control means in response to said command from said host and starts transfer between said buffer and said host interface means, said external storage interface means, and said sequencer means in a time sharing mode.

13. The external storage system of claim 12, wherein said memory control means performs said transfer between said buffer and said host interface means, said external storage interface means, and said sequencer means through respective first-in first-out buffers.

14. The external storage system of claim 11, wherein said sequencer means further comprises:

a decoder for decoding program instructions read from said buffer;

arithmetic means and address generating means controlled by signals from said decoder; and register selecting means for selecting a register in said control means based on an address from said address generating means.

15. A method for controlling an external storage in response to a command from a host, comprising the machine executed steps of:

a microprocessor loading a program into a buffer for controlling data transfer between said host, said buffer, and said external storage;

controlling said data transfer by reading from said buffer and executing said program independent from said microprocessor; and starting of said controlling step by said microprocessor in response to said command from said host.

16. The method of claim 15, wherein said loading step further comprises said microprocessor loading said program from memory of said microprocessor into said buffer at initialization time.

17. The method of claim 16, wherein said loading step further comprises said microprocessor loading said program from said memory into a program storage area wherein said buffer is partitioned into a data storage area and said program storage area.

18. The method of claim 15, wherein said controlling step further comprises:

exchanging data and commands with said host;

exchanging data with said external storage; and executing said program by a sequencer.

19. The method of claim 18, wherein said executing step further comprises:

decoding program instructions read from said buffer.

\* \* \* \* \*